(12) United States Patent
Harlin et al.

(10) Patent No.: US 6,455,643 B1
(45) Date of Patent: Sep. 24, 2002

(54) PROCESS FOR PREPARING PROPYLENE HOMOPOLYMERS AND COPOLYMERS

(75) Inventors: Ali Harlin, Vantaa (FI); Kauno Alastalo, Porvoo (FI); Esa Korhonen, Porvoo (FI); Jouni Kivelä, Helsinki (FI)

(73) Assignee: Borealis Technology Oy, Porvoo (FI)

(*) Notice: Subject to any disclaimer, the term of this patent is extended or adjusted under 35 U.S.C. 154(b) by 0 days.

(21) Appl. No.: 09/103,397

(22) Filed: Jun. 24, 1998

(30) Foreign Application Priority Data

Jun. 24, 1997 (FI) ................................. 972726

(51) Int. Cl.$^7$ ............................. C08F 2/34; C08F 10/06
(52) U.S. Cl. ............................. 526/65; 526/64; 526/68; 526/88; 526/905; 525/52; 525/53; 525/54; 525/240; 525/242; 525/319; 525/322
(58) Field of Search ............................. 526/65, 68, 64, 526/88, 905; 525/240, 242, 52, 53, 54, 319, 322

(56) References Cited

U.S. PATENT DOCUMENTS

| | | |
|---|---|---|
| 4,368,291 A | 1/1983 | Frese et al. |
| 4,424,341 A | 1/1984 | Hanson et al. |
| 4,740,550 A | 4/1988 | Foster |
| 4,740,551 A | 4/1988 | Foster |
| 5,234,879 A | 8/1993 | Garoff et al. |
| 5,385,992 A | 1/1995 | Koskinen et al. |
| 5,854,355 A | * 12/1998 | Oka et al. ............ 525/53 X |

FOREIGN PATENT DOCUMENTS

| | | |
|---|---|---|
| DE | 4426569 A1 | 2/1995 |
| EP | 0 517 183 A2 | 12/1992 |
| EP | 0560312 A1 | 9/1993 |
| EP | 0607703 A1 | 7/1994 |
| EP | 0627449 A1 | 12/1994 |
| EP | 0 714 923 A1 | 6/1996 |
| FI | 961152 | 9/1997 |
| FI | 974621 | 6/1999 |
| FI | 974622 | 6/1999 |
| FI | 974623 | 6/1999 |
| GB | 1532231 | 11/1978 |
| JP | B 58-065710 | 4/1983 |
| JP | B 01-263107 | 10/1989 |
| JP | B 03-084014 | 4/1991 |
| WO | WO 88/02376 | 4/1988 |
| WO | WO 92/19653 | 11/1992 |
| WO | WO 92/19658 | 11/1992 |
| WO | WO 92/19659 | 11/1992 |
| WO | WO 95/01831 | 1/1995 |
| WO | WO 95/12622 | 5/1995 |
| WO | WO 96/18662 | 6/1996 |
| WO | WO 97/03124 | 1/1997 |
| WO | WO 97/13790 | 4/1997 |
| WO | WO97/36938 | 10/1997 |
| WO | WO97/36939 | 10/1997 |
| WO | WO98/12234 | 3/1998 |

OTHER PUBLICATIONS

Front page of FI 906282 corresponds with 5,234,879.
Abstract of FI 971368.
Abstract of FI 971367.
Front page of FI 933703 corresponds with WO 95/01831.
Front page of FI 932580 corresponds with EP 0 627 449 A1.
Front page of FI 925913 corresponds with EP 0 607 703 A1.
Front page of FI 912264 corresponds with WO 92/19659.
Front page of FI 912263 corresponds with WO 92/19658.
Front page of FI 912262 corresponds with WO 92/19653.
Macromol. Sump. 89 73–89 (1995) Albizzati et al "Recent advances in . . . ".
Makromol. Chem. 192 2857–2863 (1991) Harkonen et al "External silane . . . ".
Encyclopedia of Pol. Science and Eng. 2nd Ed, vol. 6 544–559.

* cited by examiner

Primary Examiner—Fred Teskin
(74) Attorney, Agent, or Firm—Birch, Stewart, Kolasch & Birch, LLP (57) ABSTRACT

Described herein is a process and an apparatus for preparing propylene homopolymers and copolymers, which comprises polymerizing propylene optionally with comonomers in the presence of a catalyst at elevated temperature and pressure in at least one slurry reactor and at least one gas phase reactor, the polymerization product of at least one slurry reactor, containing unreacted monomers, being conducted to a first gas phase reactor essentially without recycling of the unreacted monomers to the slurry reactor. The invention provides for fast start-ups because the gas phase bed material is available directly from the loop reactor.

30 Claims, 3 Drawing Sheets

PROCESS FOR PREPARING PROPYLENE HOMOPOLYMERS AND COPOLYMERS

BACKGROUND OF THE INVENTION

1. Field of the Invention

The present invention relates to propylene polymerization. In particular, the present invention concerns a process for preparing homopolymers and copolymers of propylene in a reactor system comprising a combination of at least one slurry reactor and at least one gas phase reactor. The present invention also relates to an apparatus for producing homo- and copolymers of propylene.

2. Description of Related Art

A large number of processes for preparing propylene homo- and copolymers are known in the art. Thus, for example, when $MgCl_2$ +$TiCl_4$, a conventional, supported high-yield catalyst is used for polymerization, numerous different kinds of slurry and gas phase processes can be employed. The bulk process is a slurry process, wherein the reaction takes place in pure monomer or in a reaction medium containing more than 60 wt-% of the monomer. The main advantage of a bulk process is formed by the high catalyst activity due to the fact that polymerization takes place in liquid monomer. This means that to achieve commercially acceptable catalyst productivity (expressed as kg polymer/gram of catalyst), a short residence time in the reactor is sufficient. Short residence time in the reactor means that the reactor can be of small size compared to e.g. fluid-bed gas phase reactor. The small reactor size leads to relatively low polymer inventory in the reactor, which speeds up transitions between different products.

The gas phase processes have lower activity because polymerization takes place in gaseous monomer. This leads to longer residence times, which increases the reactor size and thus polymer inventory required leading to slower grade transitions. On the other hand, the investment cost of gas phase processes is lower (less complicated), especially due to lower unused monomer recycle leading to lower recovery equipment investment costs. Another advantage of gas phase processes is the possibility to produce high comonomer content products. Still another advantage is the better inherent safety of the gas phase processes due to lower monomer inventory and lower pressure compared to bulk processes. In order to draw benefit from and avoid draw-backs of the different features of slurry bulk and gas phase processes, combined bulk and gas phase processes have been suggested in the prior art.

For polymerization of vinyl chloride there has been proposed a slurry/gas phase reactor cascade where the first reactor is a loop reactor, and the polymer content of the loop reactor is concentrated with settling legs and led to a second reactor, which is a fluidized bed reactor. Reference is made to U.S. Pat. No. 3,622,533. The polymerization is continued in the fluidized bed. The outlet is made discontinuously using a settling leg in the loop in order to minimize the reaction medium transported to the gas phase reactor.

Polymerization of propylene is a loop reactor, which can be operated in supercritical conditions, is disclosed in U.S. Pat. No. 4,740,550. The product of the loop reactor is conducted to a gas phase reactor, wherein the reaction is continued. Before entering the gas phase the fines fraction of the polymerization product of the loop reactor is removed and fully or partly circulated back to the loop reactor. Together with the fines, a part of the unreacted monomers from the gas phase reactor is recycled directly to the 1st stage loop reactor.

The main object of U.S. Pat. No. 4,470,550 is to provide a process for preparing a block copolymer of high quality by feeding homopolymer with narrow residence time distribution to the block copolymerization stage. The process disclosed comprises the following stages: first stage homopolymerization in a bulk, loop reactor, fines removal cyclone between the first and second stage, second stage homopolymerization in a gas phase reactor and finally impact copolymerization in an additional gas phase reactor.

One problem with the process in U.S. Pat. No. 4,740,550 is that if all the fines removed from the first stage loop reactor outlet are circulated back to the loop reactor, there is a risk that eventually the loop reactor is filled with inactive dead catalyst or slightly polymerized dead fines. On the other hand if a portion of this fines stream is combined with the product from the last reactor, this might cause inhomogenity problems in the final product. Still further if a portion of this fines stream is collected separately and blended with a separate homopolymer product as also suggested in U.S. Pat. No. 4,470,550, this leads to complicated and economically unacceptable operation. As will be discussed in the detailed description of the present invention, we have found that impact copolymer of high quality can be produced with two-stage homopolymerization followed by an impact copolymerization step without any fines removal and circulation either after the first or second stage homopolymerization.

In the present invention one of the main objects is to minimize the amount of circulation by a specific sequence of reactors and by selecting the relative amounts produced in each reactor with that object in mind. This is an idea, which is clearly not the object of U.S. Pat. No. 4,740,550. This point is further clarified in the detailed description of the invention and in the examples.

For polymerization of olefins a process is known in which the first reaction is made in liquid, and the second reaction in the absence of the liquid (cf. GB Patent No. 1 532 231).

A two-step process has also been suggested for polymerization of ethylene, cf. U.S. Pat. No. 4,368,291.

A slurry prepolymerization connected to the gas phase process is proposed in WO 88/02376.

A gas phase process for polyolefins, where a special catalyst with spherical form is employed, has been proposed in EP-A 0 560 312 and EP-A 0 517 183. The catalyst is prepolymerized in a loop reactor using more than 5 parts polymer and 1 part catalyst up to 10 wt-% of total production.

JP Patent Applications (Laid Open) Nos. 58/065,710, 01/263,107 and 03/084,014 describe the manufacture of propylene-ethylene block copolymers in an apparatus comprising a combination of a slurry reactor and a gas phase reactor. The polymer slurry from the slurry reactor is fed into a classifying system installed between propylene polymerization vessels, and a slurry containing coarse particles is supplied to a flash for gas separation and polymer is then fed to an ethylene-propylene copolymerization vessel, while the slurry containing fines is returned to the slurry vessel.

Some of the disadvantages associated with bulk and gas phase processes, respectively, are avoided by the suggested prior art combination processes. However, none of them meets the requirements for flexibility and low production costs dictated by the commercial production configuration. The recycling of large amounts of unreacted monomers from the the second stage reactor back to the first stage slurry (bulk) reactor increases investment and production costs and prevents independent control of reaction medium composition in the two reactors.

SUMMARY OF THE INVENTION

It is an object of the present invention to eliminate the problems related to the prior art of single and multiple-reactor processes and to provide a novel process for preparing homopolymers and copolymers of propylene (and other alfa-olefin(s)).

It is another object of the invention to provide a highly versatile process which can be used for preparing a wide range of different homopolymer and copolymer products of propylene.

It is a third object of the invention to provide a novel apparatus for producing homo- and copolymers of propylene.

These and other objects, together with the advantages thereof over known processes, which shall become apparent from specification which follows, are accomplished by the invention as hereinafter described and claimed.

The process according to the present invention is based on a combination of at least one slurry reactor and at least one gas phase reactor connected in series, in that order, to form a cascade. Propylene homo- and copolymers are prepared in the presence of a catalyst at elevated temperature and pressure. According to the invention, the polymerization product of at least one slurry reactor, containing unreacted monomers, is conducted to a first gas phase reactor with minimum or no recycling of monomer back to the slurry reactor.

The homo- or copolymers prepared in the combination of the slurry and first gas phase reactor are homophasic, i.e. miscible, and any rubbery component is added later.

According to another aspect of the invention, at least one slurry reactor and at least one gas phase reactor connected in series are employed as a reactor system, the at least one slurry reactor being a bulk loop reactor operated at high or super critical temperature, and the content of the slurry reactor, including the polymer product and reaction medium containing unreacted monomers, being directly fed into the gas phase reactor fluidized bed.

According to still a further aspect of the invention, the reactor product of at least one slurry reactor is subjected to product separation by reducing the pressure thereof to evaporate volatile components. The solid substances of the product separation operation are conducted to the gas phase reactor. The evaporated reaction medium including the unreacted monomers are separated from the other volatile components and also fed to the gas phase reactor, whereas hydrogen and inert hydrocarbons (e.g. lower alkanes), if any, are removed. The separated stream can be used in further reactors, e.g. as a hydrogen rich stream instead of hydrogen feed, or the hydrogen can be recovered for other purposes.

The apparatus comprises a reactor cascade formed by at least one slurry reactor connected in series with at least one gas phase reactor together with a conduit interconnecting said one slurry reactor with said one gas phase reactor for conducting essentially all of the unreacted monomers from the slurry reactor to the gas phase reactor.

More specifically, the process according to the present invention is mainly characterized by what is stated in the body of claim 1.

The invention achieves a number of considerable advantages. With the present arrangement it has been found that the monomer fed into the first reactor can, to a large extent or fully, be consumed in the gas phase reactor(s) after the slurry reactor. This is possible due to gas phase operation with small amount af gas leaving with the polymer product. The loop reactor dynamics in the cascade provides fast transitions and high productivity. Fast start-ups are also possible because the gas phase bed material is available directly from the loop reactor. With the loop and gas phase reactor cascade it is possible to produce a large variety of different broad molecular weight distribution or bimodal products. The at least one gas phase reactor provides high flexibility in the reaction rate ratio between the first and second part of the product because of adjustable bed level and reaction rate. The gas phase reactor has no solubility limitations which makes it possible to produce polymers of high and very high comonomer content.

Furthermore, one of the preferred embodiments depicted in FIG. 3 below, which comprises separation of light components before the recovered monomer is fed into the gas phase, makes it possible independently to control polymerization conditions in slurry and gas phase, respectively, and thus provides for maximum flexibility of polymer alloy preparation.

In summary, by means of the present invention it is possible to provide:

A. A process for preparing standard and novel homopolymers and copolymers of propylene;

B. A process with minimum or no recycling of monomer (s) back to the first stage reactor leading to cost effective production;

C. A process, which produces standard homopolymer, propylene-ethylene random copolymer and propylene-ethylene impact copolymer grades at similar or lower cost than best state of the art technology;

D. A process, which produces novel propylene homopolymer, propylene-alfa-olefin random copolymer, propylene-ethylene-alfa-olefin terpolymer and propylene-ethylene-(alfa-olefin) impact copolymer grades at a cost similar or not significantly higher than the production of corresponding standard grades by the best state of the art technology;

E. A process, where high productivity, fast dynamics and compact reactor size of the 1st stage is combined by direct feed with the high once-through conversion, product and residence time flexibility and feed monomer evaporation power of the second stage;

F. A process as stated in E combined with a 3rd stage impact copolymerization reactor and further to provide such a product transfer system between stages 2 and 3 that possible excess hydrogen coming from stage 2 can be removed before stage 3;

G. A process as stated in E with a possibility to prepare novel polymer grades with broad molar mass distribution and/or high comonomer(s) content;

H. A process as stated in F with a possibility to prepare novel polymer grades with broad molar mass distribution and/or high comonomer(s) content;

I. A process, where high productivity, fast dynamics and compact reactor size of the 1st stage is combined via separation unit with the high once-through conversion, product and residence time flexibility and feed monomer evaporation power of the second stage;

J. A process as stated in I combined with a 3rd stage impact copolymerization reactor and further to provide such a product transfer system between stages 2 and 3 that possible excess hydrogen coming from stage 2 can be removed before stage 3;

K. A process as stated in I, where the composition of the reactors can be controlled largely independently allowing a possibility to prepare highly novel polymer grades;

L. A process as stated in J, where the composition of the reactors can be controlled largely independently allowing a possibility to prepare highly novel polymer grades; and M. A process as stated in any of the objectives above, where the 1st stage reactor is operated at high or supercritical temperature to increase productivity, to improve heat removal and to provide a compact reactor size.

DETAILED DESCRIPTION OF THE INVENTION

Definitions

For the purpose of the present invention, "slurry reactor" designates any reactor, such as a continuous or simple batch stirred tank reactor or loop reactor, operating in bulk or slurry and in which the polymer forms in particulate form. "Bulk" means a polymerization in reaction medium that comprises at least 60 wt-% monomer. According to a preferred embodiment the slurry reactor comprises a bulk loop reactor.

By "gas phase reactor" is meant any mechanically mixed or fluid bed reactor. Preferably the gas phase reactor comprises a mechanically agitated fluid bed reactor with gas velocities of at least 0.2 m/sec.

"High temperature polymerization" stands for polymerization temperatures above a limiting temperature of 80° C. known to be harmful for high yield catalysts of related prior art. At high temperatures the stereospecificity of the catalyst and the morphology of the polymer powder can be lost. This does not take place with the particularly preferred type of catalysts used in the invention which is described below. The high temperature polymerization takes place above the limiting temperature and below the corresponding critical temperature of the reaction medium.

"Supercritical polymerization" designates polymerization that takes place above a corresponding critical temperature and pressure of the reaction medium.

By "direct feed" is meant a process wherein the content of the slurry reactor, the polymerization product and reaction medium, is led directly to the next stage gas phase reactor fluidized bed.

By "indirect feed" is meant a process wherein the content of the slurry reactor is fed into the gas phase reactor fluidized bed, the polymerization product via a reaction medium separation unit and the reaction medium as a gas from the separation unit. Before the reaction medium is entered into the gas phase, some component, e.g. hydrogen, can be fully or partially removed therefrom with various technical means, such as membranes.

"Separation unit" means a unit operation wherein some light components, e.g. hydrogen or optionally nitrogen, can be separated from monomer(s) fully or partially with various technical means such as membranes, distillation, stripping or vent condensing.

"Reaction zone" stands for one or several reactors of similar type producing the same type or characteristics of polymer connected in the series.

The expressions "essentially without monomer recycling" and "with minimum or no monomer recycling" are synonymously used to indicate that less than 30 wt-%, preferably less than 20 wt-%, in particular 0 wt-% of the monomers of the slurry reactor feed are recycled to the slurry process. By contrast, in conventional processes normally 50 wt-% or more of the slurry process feed is recycled back to the slurry reactor.

The Overall Process

The present invention concerns a multistage process consisting of a bulk reaction zone including at least one slurry reactor, and a gas phase reaction zone including at least one gas phase reactor. The gas phase reaction zone is arranged in cascade after at least one slurry reactor with a minimum or no recycling of monomer back to the first reactor and with direct feed or indirect feed to the gas phase for homo- or copolymerizing propylene.

In the direct feed process the content of the slurry reactor, the polymerization product and reaction medium, is conducted directly to the fluidized bed reactor. The product outlet from the slurry reactor can be discontinuous, or preferably continuous. The slurry is led to the gas phase reaction zone as such without separation of any gases or particle streams based on different particle size. No particles are returned to the loop. Optionally, the line between the slurry reactor and the gas phase reactor can be heated in order to evaporate only a part or all of the reaction medium before it enters the gas phase reactor polymer bed.

In the indirect feed to the gas phase process the content of the slurry reactor is led first into a reaction medium separation unit. The polymer is conducted into the gas phase reactor fluidized bed from said separation unit. The off gas from the separation unit is lead into the gas phase reactor is gaseous form. However, before entering the gas phase the off gas is fully or partially freed from, e.g. hydrogen, with various technical solutions e.g. membranes or stripping. Alternatively the off gas can be condensed, and optionally hydrogen or other light components can be removed before the liquid monomer is fed into the gas phase reactor. Gaseous monomer can be fed into any suitable place in the gas phase reactor, e.g. reactor circulation line, or directly into the reactor. The liquid monomer can be fed optionally into the polymer bed above the distribution plate, e.g. into the powder feed line, or into the circulation line before or after the circulation cooler.

The reaction is continued in the gas phase reactor(s). Monomer entering the gas phase from the slurry reactor is part of the reactor gas inventory until it is converted into the polymer.

In two reactor operation the polymer leaving the gas phase reactor with the outlet system enters a solid/gas separation unit. The polymer from the bottom is fed to further processing steps and the gas is compressed and circulated back to the gas phase reactor after purification steps. Typically light inerts, such as methane and ethane, and heavier inerts such as propane and oligomers are removed in these purification steps. The purification can be performed with distillation or membrane separation. In case of distillation the monomers are circulated back to the gas phase reactor mainly as liquid.

In three reactor operation the polymer leaving the 1st gas phase reactor with the outlet system enters a solid/gas separation unit. The polymer from the bottom is fed further to 2nd gas phase reactor and the gas is compressed and circulated back to the 1st gas phase reactor after purification steps. Typically light inerts, such as methane and ethane, and heavier inerts such as propane and oligomers are removed in these purification steps. The purification can be performed with distillation or membrane separation. In case of distillation the monomers are circulated back to the gas phase reactor mainly as liquid.

Optionally in three reactor operation the polymer leaving the 1st gas phase reactor with the outlet system enters the 2nd gas phase reactor directly with the accompanying gas.

In three reactor operation the polymer leaving the 2nd gas phase reactor with the outlet system enters a solid/gas separation unit. The polymer from the bottom is fed to further processing steps and the gas is compressed and partly circulated back to the 2nd gas phase reactor directly, partly after purification steps. Typically light inerts, such as methane and ethane, and heavier inerts such as propane and oligomers are removed in these purification steps. The purification can be performed with distillation or membrane separation. In case of distillation an ethylene rich stream is circulated back to the 2nd gas phase reactor and a propylene-propane stream is fed to propane and oligomers removal steps.

The polymerization products are obtained by using a catalyst. The catalyst can be any catalyst providing adequate activity at elevated temperature. The preferred catalyst system used comprises a high yield Ziegler-Natta catalyst having catalyst component, a co-catalyst component, an external donor and, optionally, an internal donor. Another preferred catalyst system is a metallocene-based catalyst having a bridged ligand structure giving high stereoselectivity, and which is impregnated on a carrier or support in the form of an activated complex.

The polymerization temperature for homopolymers is at least 80° C. and for copolymers at least 60° C. preferably at least 65° C. The slurry reactor is operated at elevated pressure at least 35 bar up to 100 bar, and the gas phase reactor(s) at least 10 bar up to dew point pressure. Alternatively any reactor of the reactors in the series can be operated above the critical temperature and pressure, as described in, for example, WO 97/13790.

Propylene and optionally one or more other $C_2$ to $C_{16}$ olefins, e.g. ethylene, 1-butene, 4-methyl-1-pentene, 1-hexene, dienes, or cyclic olefins, are subjected to polymerization and copolymerization, respectively, in a plurality of polymerization reactors connected in series. The optional olefin(s) can be used in any of the reactors. Different amounts of hydrogen can be used as a molar mass modifier or regulator in any or every reactor.

The desired homo- or copolymers of propylene can be recovered from the flash or product outlet tank of the gas phase reaction zone.

The Catalyst

The polymerization products are obtained by using a catalyst. As catalyst any stereospecific catalyst for propylene can be used, which has high yield and useful polymer properties e.g. isotacticity and morphology at the high temperature and possible supercritical polymerization.

The preferred catalyst system used comprises a high yield Ziegler-Natta catalyst having catalyst component, a cocatalyst component, optionally, an external donor and an internal donor. Another preferred catalyst system is a metallocene catalyst having a bridged ligand structure giving high stereoselectivity, and which has an active complex impregnated on a carrier. Finally, the catalyst is preferably any other catalyst providing adequate activity at elevated temperature.

Examples of suitable systems are described in for example, U.S. Pat. No. 5,234,879, EP 0627449 and WO 92/19653, WO 92/19658 and WO 92/19659.

One particularly preferable catalyst, which can be used in the present invention is disclosed in WO 92/19653. Another preferred catalyst is disclosed in WO 98/12234.

A catalyst system useful in the present process can be prepared by reacting a magnesium halide compound with titanium tetrachloride and an internal donor. The magnesium halide compound is for example, selected from the group of magnesium chloride, a complex of magnesium chloride with lower alcohol and other derivatives of magnesium chloride. $MgCl_2$ can be used as such or it can be combined with silica, e.g. by filling pores of the silica with a solution or slurry containing $MgCl_2$. The lower alcohol used can be preferably methanol or ethanol, particularly ethanol.

The titanium compound used in the preparation of the procatalyst is preferably an organic or inorganic titanium compound, having an oxidation state of titanium of 3 or 4. Also other transition metal compounds, such as vanadium, zirconium, chromium, molybdenum, and tungsten compounds can be used or mixed with the titanium compound. The titanium compound usually is halide or oxyhalide, an organic metal halide, or a purely metal organic compound, in which only organic ligands have been attached to the transition metal. Particularly preferable are the titanium halides, especially $TiCl_4$. Preferably the titanation meaning catalyst carrier treatment with $TiCl_4$ is carried out in two or three steps.

The alkoxy group of the phtalic acid ester used comprises at least five carbon atoms, preferably at least 8 carbon atoms. Thus, as the ester can be used for example propylhexyl phthalate, dioctyl phthalate, dionyl phthalate, diisodecyl phthalate, di-undecyl phthalate, ditridecyl phthalate or ditetradecyl phthalate. The molar ratio of phthalic acid ester and magnesium halide is preferably about 0.2.

$R_nR'_mSi(R''O)_{4-n-m}$ wherein R and R' can be the same or different and independently represents a linear, branched or cyclic aliphatic, or aromatic group. The aliphatic groups can be saturated or unsaturated. As examples of suitable linear $C_{1-12}$ hydrocarbons, methyl, ethyl, n-propyl, n-butyl and n-octyl can be mentioned. Saturated branched $C_{1-8}$ alkyl groups are represented by isopropyl, isobutyl, isopentyl, tert-amyl, and neopentyl. Cyclic aliphatic groups containing 4 to 8 carbon atoms are, e.g. cyclopentyl, cyclohexyl, methyl cyclopentyl and cycloheptyl. In the formula, n is an integer 0 to 3, m is an integer 0 to 3 and n+m is 1 to 3.

"Strongly co-ordinating donor" designates donors which forms relatively strong complexes with catalyst surface, mainly with $MgCl_2$ surface in the presence of aluminium alkyl and $TiCl_4$. The donor components are characterised with strong complexation affinity towards catalyst surface and a sterically large and protective hydrocarbon (R'). Typically this kind of donors has the structure $R'_nSi(OMe)_{4-n}$ wherein R' is branched aliphatic or cyclic or aromatic group, and n is 1 or 2, preferably 2. [Makromol Chem. 192 (1991) p. 2857–2863, Härkönen et. al.] Use of this kind of donors will result in highly isotactic PP.

Another group of such donors are 1,3-diethers $R'C(COMe)_2$ wherein R' is branched aliphatic or cyclic or aromatic group.

Generally with all donors strong co-ordination with $MgCl_2$ requires an oxygen-oxygen distance of 2.5–2.9 Å. [Macromol. Symp. 89, (1995) p. 73–89) Albizzati et. al.]

In particular, the external donor is selected from the group consisting of dicyclopentyl dimethoxysilane and di-t-butyl dimethoxysilane.

An organoaluminium compound is used as a cocatalyst. The organoaluminium compound is preferably selected from the group consisting of trialkylaluminium, dialkyl aluminium chloride and alkyl aluminium sesquichloride.

A catalyst, which can optionally be used in the present inventions is disclosed in FI Patent Applications Nos. 974621, 974622, 974623 and in PCT/FI97/00191 and PCT/FI97/00192.

Optionally any metallocene catalyst capable of catalyzing the high and low or medium molar mass product can be used. The hydrogen sensitivity of the metallocene catalyst can be up different from that of a Ziegler-Natta catalyst which means that different hydrogen concentrations can be employed in the reactors.

The metallocene catalyst comprises a metallocene/activator reaction product impregnated in a porous support a maximum internal pore volume. The catalyst complex comprises a ligand which is typically bridged, and a transition metal of group IVA . . . VIA, the catalytic metal is typically a halide, and aluminium alkyl. The ligands can belong to group of cyclic or heterocyclic substituted or unsubstituted compounds, e.g. cyclopentadienyls, indenes, or any other bulky compound which can control the stereoselectivity of the catalyst especially when ligands are bridged together with silane or other chemical bond. The activator is selected from a group in which are derivates of water and aluminium alkyls e.g. trimethyl aluminium, triethyl aluminium, and tri t-butyl aluminium, or another compound capable of activating the complex. The metallocene/activator reaction product, a solvent capable of dissolving it, and a porous support are brought into mutual contact, the solvent is removed and the porous support is impregnated with the metallocene/activator reaction product, the maximum amount of which corresponds to the pore volume of the support, cf. International PCT Application No. PCT/FI94/00499.

Prepolymerization

The catalyst can be prepolymerized prior to feeding into the first polymerization reactor of the series. During prepolymerization the catalyst components are contact with a monomer, such as an olefin monomer, before feeding into the reactor. Examples of suitable systems are described in, for example, FI Patent Application No. FI 961152.

It is also possible to carry out the prepolymerization in the presence of a viscous substance, such as an olefinic wax, to provide a prepolymerized catalyst which is stabile during storage and handling. The catalyst prepolymerized in wax will allow for easy dosing of the catalyst into the polymerization reactors. Examples of suitable systems are described in, for example, EP 0607 703. Typically about 1 part of catalyst is used for a maximum of 4 parts of polymer.

The monomer used for prepolymerization can be selected from the group consisting of propylene, 1-butene, 4-methyl-1-pentene, 3-methyl-1-butene, vinylcyclohexane, cyclopentene, 1-hexene, 1-octene, and 1-decene.

The prepolymerization can be performed batchwise in wax or in a continuous prepolymerization reactor or in a continuous plug flow type prepolymerization reactor.

Polymerization

The invention is based on the combination of at least one slurry reactor and at least one gas phase reactor connected in series, called a cascade.

The equipment of the polymerization step can comprise polymerization reactors of any suitable type. The slurry reactor can be any continuous or simple stirred batch tank reactor or loop reactor operating in bulk or slurry and the polymer forms in particular form in the reactor. Bulk means a polymerization in reaction medium that comprises of at least 60% (w/w) monomer. The gas phase reactor can be any mechanically mixed or fluid bed reactor. According to the present invention the slurry reactor is preferably a bulk loop reactor and the gas phase reactor is a fluidized bed type reactor with a mechanical stirrer.

Any reactor in the process can be operated in super critical polymerization conditions.

The production split between the slurry reactor and the 1st gas phase reactor is typically 67:33–50:50 when the monomer recycling back to the slurry reactor is allowed. By contrast, the production in the slurry reactor is less than or equal to the production in the first gas phase reactor when no recycling back to the slurry reactor is required. In all the cases the production in the slurry reactor is more than 10%. Thus, according to a preferred embodiment, 10 to 70 wt-%, preferably 20 to 65 wt-%, in particular 40 to 60 wt-% of the polymer is prepared in the slurry reaction zone and no monomer is recycled to the slurry reactor zone. When 50% to 67% of the polymer is prepared in the slurry reaction zone, a small amount of the monomer can be recycled to the slurry reactor from the gas phase reaction zone.

According to the invention, the polymerization process comprises at least the following steps of
  subjecting propylene and optionally other olefins to polymerization or copolymerization in a first slurry polymerization zone or reactor,
  recovering the first polymerization product from the first reaction zone with the reaction medium,
  directly or indirectly feeding the first polymerization product into a gas phase polymerization zone or reactor,
  optionally feeding additional propylene and/or comonomer(s) to the second reaction zone,
  subjecting the excess propylene and/or comonomers from 1st zone and additional propylene and/or comonomer(s) to a second polymerization reaction in the presence of the first polymerization product to produce a second polymerization product,
  recovering the polymerization product from second reaction zone, and
  separating and recovering the polypropylene from the second reaction product.

Additional the process can also comprise one or more of the following additional steps
  prepolymerizing catalyst with one or more monomer(s),
  separating gas from the second reaction zone product,
  feeding the recovered polymerization product of the earlier zones to a third or fourth reaction zone or reactor,
  optionally feeding additional propylene and/or comonomer(s) to the third and fourth reaction zone,
  subjecting the excess propylene and/or comonomer(s) and additional propylene and/or comonomers to third and fourth polymerization reaction in the presence of the polymerization product of the earlier zones to produce a third or fourth polymerization product, and
  recovering the polymerization product from the third or fourth reaction zone, and
  separating and recovering the polypropylene from the third or forth reaction product.

In the first step of the process, propylene with the optional comonomer(s) together with the activated catalyst complex and optional cocatalyst and other aid components are fed into the first polymerization reactor. Along with these components hydrogen as a molar mass regulator can be fed into the reactor in the amount required for achieving the desired molar mass of the polymer. In the embodiment of no circulation back to the slurry reactor only fresh monomer is fed into the first reactor.

Alternatively, in the embodiment of minimum recycling of the monomer back to the slurry reactor, the feed of the reactor can consist of the recycled monomer from the following reactor(s), if any, together with added fresh monomer, hydrogen, optional comonomer(s) and catalyst components.

The recovery section is designed to recover propylene and ethylene and to recycle recovered components to the first stage gas phase reactor, second stage gas phase reactor and/or the loop reactor. Another feature of the recovery section is to remove light impurities which are catalyst poisons (e.g. CO), inert components (methane, ethane, nitrogen etc.) and also to remove propane, heavy hydrocarbons, cocatalyst and oligomers.

It is an object of the present invention to minimize the amount of unreacted monomers which need to be recycled. This aim is achieved by the specific sequence of reactors and by selecting the relative amounts of polymer produced in each reactor with that object in mind. The advantages thereof are two-fold: the investment and operation cost of the recovery section is greatly reduced and these features allow for more independent control of the composition of the first two reactors, since no or very little reaction medium from the second reactor is circulated back to the first reactor.

In the embodiments of no or minimum recycling back to the slurry reactor there are two operational cases 1 and 2 for the recovery section as described in the following. The use of distillation for the separation of lights and heavies from the monomer(s) and for the separation of one monomer from another is common engineering practice.

1. Recovery in case of two reactor operation:

The gas leaving the gas phase reactor with the product is compressed with a compressor to a distillation column, here called heavies column.

Purge gas, if any, from the gas phase reactor pressure control along with the compressed gas is fed as vapour to the heavies column, wherein the heavies, cocatalyst and oligomers are removed from the bottom and light impurities and inerts from the top. The bottom product of the heavies column is sent to treatment/disposal and non-condensable lights are treated in a process section where monomer is recovered and, optionally, a hydrogen containing stream is recovered or sent to e.g. a nearby cracker or flared.

Depending on the particular polymerization recipe, there is a possibility that cooling of the heavies column condenser with water is not entirely satisfactory, i.e. it may lead to high off-gas flow and, thus, unacceptable monomer losses. This problem can be solved by cooling the condenser with a refrigerant stream so that condensing takes place at temperatures below normal cooling water temperatures. However, using a refrigeration system for the whole condenser duty results in high operation costs and high investment costs for the refrigeration equipment. Therefore, and as an alternative or complement to distillation, the off-gas stream can be treated in a number of ways to minimize monomer losses and operating costs. For example, the stream can be treated in a separation unit, which can be (A) a so-called vent condenser, wherein the off-gas stream is partly condensed with refrigerant at temperatures below cooling water temperatures, or (B) a membrane unit.

The advantage of (A) is that the main cooling duty is provided by cooling water in the primary condenser, only the non-condensable fraction is passed through a refrigerated condenser. This decreases operation and investment costs of the refrigeration equipment.

The advantage of the preferred solution (B) is that the use of refrigeration can be avoided altogether and a very high percentage of the monomers in the off-gas can be recovered. Also a hydrogen-rich stream can be recovered.

Still, alternatively, this off-gas stream can be combined with cracker streams in case of an integrated plant. A further also preferred solution comprises returning a major part of the off-gas stream to the gas phase reactor with an off-gas compressor.

The purified, condensed recovery stream is taken from heavies column condenser and the stream is recirculated to the 1st gas phase reactor through reactor propylene feed system. In case propane starts to accumulate in the system (high propane content in fresh propylene), part of the recovery stream from the condenser can be sent to, e.g., a propylene/propane splitter, where propane is removed and propylene is recovered.

In the embodiment of minimum circulation back to the slurry reactor part of the condensed recovery stream is circulated back to the loop reactor. The selection whether to circulate back to the slurry reactor depends on the production rate ratio between the slurry reactor and the gas phase reactor.

In case the gas from the gas phase reactor contains a very high hydrogen concentration (as a result of the preparation of, e.g., broad MWD homopolymers), it is possible that propylene cannot be recovered as liquid distillate from the heavies column condenser, because that stream would contain too much hydrogen (part of that stream would go into the loop reactor in case of minimum circulation). In this case, propylene is recovered as a side-stream from the column.

2. Recovery in case of three reactor operation:

In case of impact copolymer production, i.e., when the polymerization is continued in a second gas phase reactor, the operation of the recovery section is as described in the following. The main difference to the two-reactor operation is an additional column, which is needed for separation of ethylene from propane and propylene contained in the outlet gas of the second gas phase reactor.

The gas leaving the second gas phase reactor with product is compressed with a compressor and conducted to a distillation column, here called the ethylene column.

Purge gas, if any, from the second gas phase reactor pressure control along with the compressed gas is fed as vapour to the ethylene column. Ethylene rich streams from the ethylene column condenser are recycled back to the second gas phase reactor and propane and propylene are removed from the bottom. Both the possible condensed liquid distillate and the non-condensed vapour (after off-gas separation) from the condenser are recycled back to the second gas phase reactor. A part of the non-condensed vapour is removed as off-gas to remove light inerts and possibly hydrogen from the second gas phase reactor.

For this purpose, the non-condensed stream can be treated in a process section where monomer is recovered and optionally the hydrogen containing stream is recovered or sent to e.g. a nearby cracker or it is flared. The objects, benefits and preferred solutions for this process section are the same as described earlier in the case of heavies column non-condensable stream.

In all of the embodiments the presence of propylene, optional comonomer(s), cocatalyst and other aid components, the activated catalyst complex will polymerize and form a product in particulate form in the slurry reactor, i.e. polymer particles, which are suspended in the fluid circulated through the reactor.

The polymerization medium typically comprises the monomer and/or a hydrocarbon, and the fluid is either liquid or gaseous. In the case of slurry reactor, in particular a loop reactor, the fluid is liquid and the suspension of polymer is circulated continuously through the slurry reactor, whereby more suspension of polymer in particle form in hydrocarbon medium or monomer will be produced. According to preferred embodiment, the first polymerization or copolymerization reaction is carried out in a reaction medium mainly consisting of propylene. At least 60 weight percent of the medium, preferably more than 90 wt-%, is propylene.

The conditions of the slurry reactor are selected so that at least 10 wt-%, preferably at least 12 wt-% of the whole production is polymerised in the first slurry reactor. The temperature is in the range of 40 to 110° C., preferably in the range of 50 to 100° C., and even more preferably for homopolymers 80 to 100° C. and for copolymers of high comonomer content 60 to 75° C. and for copolymers with high comonomer randomness 75 to 85° C. The reaction pressure is in the range of 30 to 100 bar, preferably 35 to 80 bar, based on the vapour pressure of the reaction medium.

In slurry polymerization zone more than one reactor can be used in series. In such a case the polymer suspension in an inert hydrocarbon or in monomer produced in the 1st slurry reactor, is fed without separation of inert components and monomers periodically or continuously to the following slurry reactor, which acts at lower pressure than the previous slurry reactor.

The polymerization heat is removed by cooling the reactor with a cooling jacket. The residence time in the slurry reactor must be at least 10 minutes, preferably 20–100 min for obtaining a sufficient degree of polymerization. This is necessary to achieve polymer yields of at least 50 kg PP/.g cat. It is also advantageous to operate the slurry reactor with high solid concentrations, e.g. 50% for homopolymers and 35 or 40% for some copolymers when the particles are swelling. If the solid concentration in the loop reactor is too low, the amount of reaction medium conducted to the second reaction zone or gas phase reactor is increasing.

In the direct feed process the content of the slurry reactor, the polymerization product and reaction medium is led directly to the next gas phase reactor fluidized bed. If the first polymerization reaction is carried out in the presence of hydrogen, then the pressure of the first polymerization product including the reaction medium is optionally reduced after the reaction zone in order to evaporate volatile components of the products, e.g. in a flash tank. The polymer is led into the gas phase reactor fluidized bed. The off gas from the separation unit is lead to the gas phase reactor in gaseous form (indirect feed). Before entering the gas phase reactor some components e.g. hydrogen can fully or partially be removed from the off gas from the separation unit with various technical solutions.

The second reaction is preferably a gas phase reactor, wherein propylene and optionally comonomer(s) are polymerized in reaction medium which consists of gas or vapour.

The gas phase reactor can be an ordinary fluidized bed reactor, although other types of gas phase reactors can be used. In a fluidized bed reactor, the bed consists of the formed and growing polymer particles as well as still active catalyst come along with the polymer fraction from the slurry reactor. The bed is kept in a fluidized state by introducing gaseous components, e.g. monomer on such flow rate (at least 0.2 m/s) which make the particles act as a fluid. The fluidizing gas can contain also inert gases, like nitrogen, and also hydrogen as a modifier. In the invention it is not recommendable to use unnecessary inert gases, which may cause problems in the recovery section.

The gas phase reactor used can be operated in the temperature range of 50 to 115° C., preferably between 60 and 110° C. and reaction pressure between 10 and 40 bar and below the dew point. The partial pressure of the monomer is preferably between 2 and 40 bar or more.

According to one preferred embodiment, no fresh propylene is fed to the first gas phase reactor other than what is required for various flushings.

The pressure of the second polymerization product including the gaseous reaction medium is then reduced after the first gas phase reactor in order to separate part of the gaseous and possible volatile components (e.g. heavy comonomers and compounds used for catalyst feeds) of the product e.g. in a flash tank. The overhead gas stream is recirculated through the recovery system back to the first gas phase reactor or partly to the first gas phase reactor and partly to the slurry reactor.

If desired, the polymerization product can be fed into a second gas phase reactor and subjected to a third polymerization reaction to produce a modified polymerization product from which the polypropylene is separated and recovered. The third polymerization reaction is carried out in a gas phase reactor in the presence of comonomers which give the third polymerization product properties e.g. improved impact strength, ductility or softness. Typically part of the gases coming from the first gas phase reactor are removed in a pressure reduction step before the second gas phase reactor. The removed gases are compressed to the recovery section and handled as already described in the two reactor case. Alternatively, the second product can be transferred directly to the third reactor.

It is further possible to transfer the product of the third reaction to a fourth polymerization reaction wherein polymerization is carried out in the presence of comonomers which give the fourth polymerization product properties e.g. improved stiffness to impact balance or stress whitening or white blush properties, ductility or softness.

Generally, if copolymers are produced by means of the present invention they contain at least 0.5 wt-% of comonomer(s), in particular at least about 2 wt-% and preferably up to 20 wt-% of at least one comonomer. A typical comonomer content of a copolymer fed to the first gas phase reactor is about 2 to 16 wt-%. The copolymers produced can exhibit properties of high randomness (very soft copolymers).

If desired, the polymerization product can be fed into a second gas phase reactor in which a rubbery copolymer is provided by a third (co)polymerization reaction to produce a modified polymerization product. This third polymerization reaction will give the polymerization product properties of e.g. improved impact strength. The step of providing an elastomer can be performed in various ways. Thus, preferably an elastomer is produced by copolymerizing at least propylene and ethylene into an elastomer. The conditions for the copolymerization are within the limits of conventional EPM production conditions such as they are disclosed, e.g., in Encyclopedia of Polymer Science and Engineering, Second Edition, Vol. 6, p.545–558. A rubbery product is formed if the ethylene repeating unit content in the polymer lies within a certain range. Thus, preferably, ethylene and propylene are copolymerized into an elastomer in such a ratio that the copolymer contains from 10 to 70% by weight of ethylene units. In particular, the ethylene unit content is from 30 to 50% by weight of the copolymer propylene/ethylene elastomer. In other words, ethylene and propylene are copolymerized into an elastomer in a molar ratio of ethylene-to-propylene of 30/70 to 50/50.

The elastomer can also be provided by adding a ready-made or natural elastomer to the polymer product of the first gas phase reactor.

The impact modified polypropylene typically contains about 5 to 50 wt-%, in particular about 10 to 45 wt-% and preferably about 15 to 40 wt-% of an elastomer described above.

Figure 1:
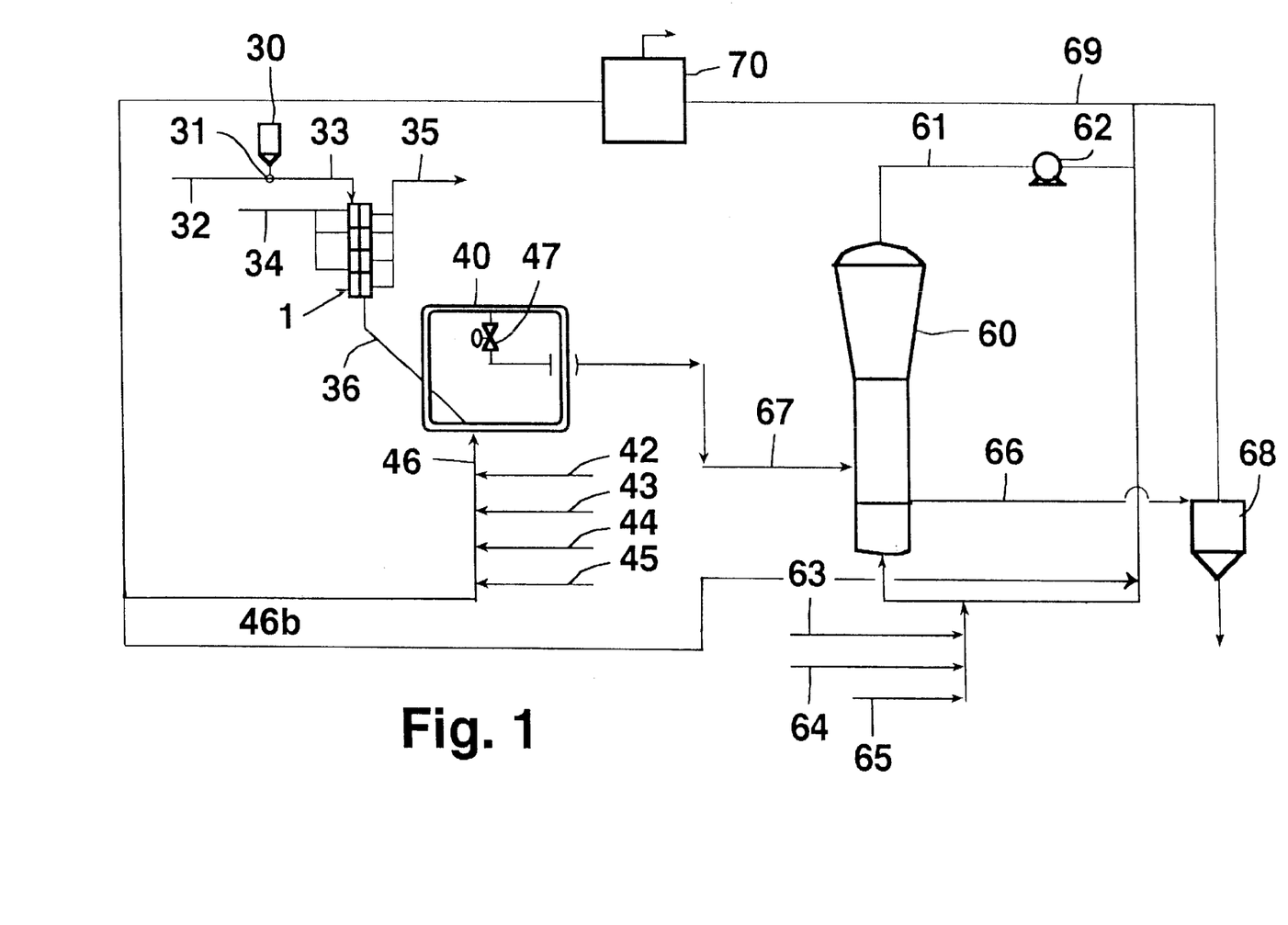
FIG. 1 depicts in a schematic fashion the process configuration of a first preferred embodiment of the invention.

Summarising what has been stated above, one particularly preferred embodiment of the invention comprises (FIG. 1)

- polymerizing propylene in a loop reactor at a pressure of 40 to 80 bar, at a temperature of 80 to 100° C. and hydrogen is used to control the molar mass of the polymerization product,
- recovering the polymerization product from the loop reactor and conducting it to a gas phase reactor fluid bed,
- optionally feeding additional propylene and optional comonomer to the gas phase reactor,
- optionally feeding additional hydrogen to the gas phase reactor to control the hydrogen-to-propylene ratio to provide the desired molecular mass of the polymerization product,
- recovering the polymerization product from the gas phase reactor and conducting it to a flash tank, wherein the pressure of the product is reduced to produce an overhead product containing essentially non-reacted propylene and hydrogen and a bottom product primarily containing polymerized solids,
- recycling the overhead product or at least a major part of it to the gas phase reactor via a recovery section, and
- recovering polypropylene polymer as the bottom product of the flash tank.

According to the second particularly preferred embodiment (FIG. 1):

- propylene and copolymer(s), e.g. ethylene or 1-butene or both, are polymerised in a loop reactor at a pressure of 40 to 80 bar, at a temperature of 60 to 80° C. and hydrogen is used to provide a polymerization product having the desired molar mass,
- the polymerization product from the loop reactor is conducted directly to a gas phase reactor fluid bed,
- optionally additional propylene and comomomer(s) are fed to the gas phase reactor,
- optionall additional hydrogen is fed to the gas phase reactor to control the hydrogen-to-propylene ratio to provide desired molecular mass of the polymerization product,
- the polymerization product is recovered from the gas phase reactor and conducted to a flash tank, wherein the pressure is reduced to produce an overhead product containing essentially non-reacted monomers and hydrogen and a bottom product primarily containing polymerized solids,
- the overhead product or at least a major part of it is recycled to the gas phase reactor via a recovery section, and
- polypropylene polymer is recovered as the bottom product of the flash tank.

Figure 2:
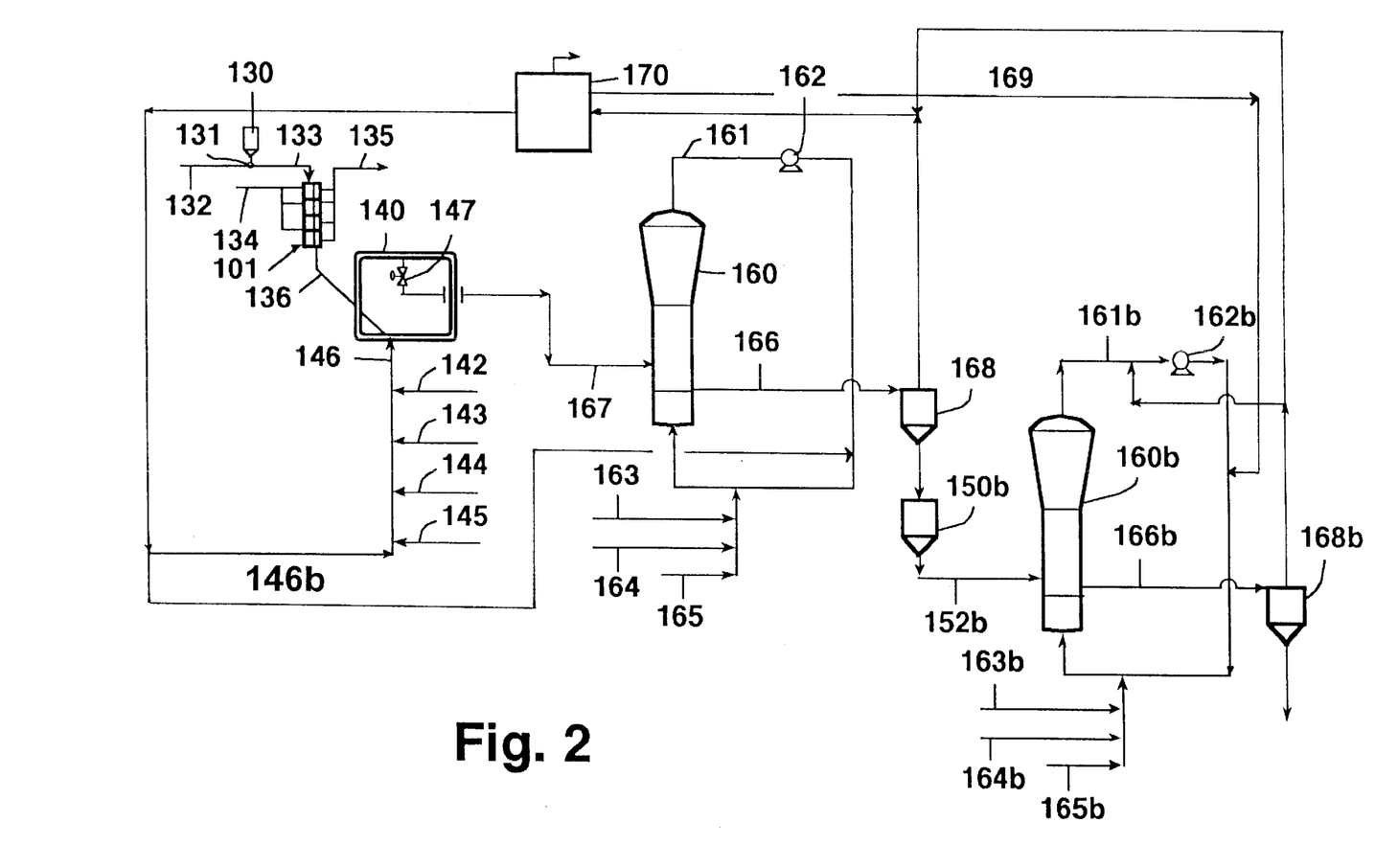
FIG. 2 depicts in a schematic fashion the process configuration of a second preferred embodiment of the invention.

According to the third particularly preferred embodiment (FIG. 2):

- propylene and optionally comonomers are polymerised in a loop reactor at a pressure of 40 to 80 bar, at a temperature of 60 to 100° C. and hydrogen is used to control the molar mass of the polymerization product,
- the polymerization product from the loop reactor is recovered and conducted to a gas phase reactor fluid bed,
- optionally additional propylene and optional comonomer is fed to the gas phase reactor,
- additional hydrogen is optionally fed to the gas phase reactor to control. The hydrogen-to-propylene ratio to provide desired molecular mass of the polymerization product,
- the polymerization product from the first gas phase reactor is recovered and conducted to an intermediate flash tank, wherein the pressure of the product is reduced to produce an overhead product containing essentially non-reacted monomer(s) and hydrogen and a bottom product primarily containing polymerised solids,
- the overhead product or at least a major part of it is recycled to the first gas phase reactor via a recovery section,
- the polypropylene polymer from the bottom of the intermediate flash tank is fed to a third polymerization reaction via a polymer feed system,
- the third polymerization reaction is carried out in a gas phase reactor in the presence of comonomers,
- the polymerization product from the second gas phase rector is recovered and conducted to a flash tank, wherein the pressure of the product is reduced to produce an overhead product containing essentially non-reacted monomer(s) and hydrogen and a bottom product containing primarily polymerised solids,
- optionally the polymerization product from the third polymerization can be conducted directly or via a flash tank to a third (fourth etc.) gas phase polymerization reactor, wherein polymerization is carried out in the presence of comonomers.

According to a fourth particularly preferred embodiment (FIG. 3):

- propylene and optionally comonomers are polymerised in a loop reactor at a pressure of 40 to 80 bar, at a temperature of 60 to 100° C. and hydrogen is used to control the molar mass of the polymerization product,
- the polymerization product from the loop reactor is recovered and conducted to a flash separator, from where the hydrocarbon medium is removed from the top as the overhead and the polymer from the bottom,
- the overhead is treated in e.g. membrane unit to remove hydrogen and/or other components,
- the treated overhead is conducted to the next gas phase reactor,
- the polymer from the bottom is fed to next gas phase reactor fluid bed,
- optionally additional propylene and optional comonomer is fed to the gas phase reactor,
- optionally additional hydrogen is fed to the gas phase to control the hydrogen-to-propylene ratio to provide desired molecular mass of the polymerization product,
- the polymerization product from the first gas phase reactor is recovered and conducted to a flash tank, wherein the pressure of the product is reduced to produce an overhead product containing essentially non-reacted monomer(s) and hydrogen and a bottom product primarily containing polymerised solids,
- polypropylene polymer is recovered as the bottom product of the flash tank
- optionally the polymerization product from the second polymerization can be conducted directly or via a flash tank to a third (fourth etc.) gas phase polymerization reactor, wherein polymerization is carried out in the presence of comonomers.

The apparatus for carrying out the fourth embodiment comprises in combination:

- at least one slurry reactor and at least one gas phase reactor, arranged in series to form a cascade, a flash tank for separating polymer from reaction medium containing unreacted monomers and volatile compounds, said tank having an inlet for a polymerization product and an outlet for the polymer and an outlet for the reaction medium, a separation means for separating volatile compounds from the reaction medium, said separation means having an inlet for the reaction medium and an outlet for the reaction medium and an outlet for the volatile compounds, a first conduit interconnecting at least one slurry reactor with the inlet of the flash tank, a second conduit interconnecting the outlet of the polymer with at least one gas phase reactor a third conduit interconnecting the outlet of the reaction medium with the inlet of the separation means, and a fourth conduit interconnecting the outlet of the reaction medium with the gas phase reactor.

These above-mentioned four preferred embodiments are also depicted in the attached drawings, which illustrate the particular configuration of process equipment used. The numerals refer to the following pieces of equipment:

| | |
|---|---|
| 1; 101; 201 | prepolymerization reactor |
| 30; 130; 230 | catalyst reservoir |
| 31; 131; 231 | feeding device |
| 32; 132; 232 | diluent (optional) |
| 33; 133; 233 | catalyst/diluent mixture |
| 34; 134; 234 | inonomer |
| 35; 135; 235 | cocatalyst and possible donors |
| 40; 140; 240 | loop reactor |
| 42; 142; 242 | diluent feed (optional) |
| 43; 143; 243 | monomer feed |
| 44; 144; 244 | hydrogen feed |
| 45; 145; 245 | comonomer feed (optional) |
| 46; 146; 246 | back to the loop reactor 40; 140; 240 through the line 46; 146; 246 |
| 46b; 14b; 246b | recirculation to recovery recirculation to recovery |
| 47; 147; 247 | one or several exhaust valve |
| 248 | product transfer line |
| 150b, 250 | flash separator |
| 251 | recovery unit and off gas vent |
| 252 | removing line |
| 152b | removing line |
| 60; 160; 160b | gas phase reactor |
| 260 | gas phase reactor |
| 61; 161; 161b | gas transfer line |
| 261b | gas transfer line |
| 62; 162; 162b | compressor |
| 262 | compressor |
| 63; 163; 163b | monomer feed |
| 263 | monomer feed |
| 64; 164; 164b | comonomer feed |
| 264 | comonomer feed |
| 65; 165; 165b | hydrogen feed |
| 265 | hydrogen feed |
| 66; 166; 166b | transfer line |
| 266 | transfer line |
| 67; 167 | product transfer line |
| 68; 168; | polymer product recovery system, e.g. flash tank |
| 268; 269b | polymer product recovery system, e.g. flash tank |
| 69; 169; 269 | recovery line |
| 269a | recovery line |
| 251 | separation unit |
| 70; 170; 270 | monomer recovery system |

Turning to FIG. 1, it can be noted that catalyst from reservoir 30 is fed to the feeding device 31 together with optional diluent from line 32. The feeding device 31 feeds the catalyst/diluent mixture into the prepolymerization chamber 1 via line 33. Monomer is fed through 34 and cocatalyst and possible donors can be fed into the reactor 1 through conduits 35 or, preferably, the cocatalyst and donor (s) are intermixed and fed in line 35.

From the prepolymerization chamber 1 the prepolymerized catalyst is removed preferably directly through line 36 and transferred to a loop reactor 40. In the loop reactor 40 the polymerization is continued by adding an optional diluent from the line 42, monomer from line 43, hydrogen from line 44 and an optional comonomer from line 45 through the line 46. An optional cocatalyst can also be introduced into the loop reactor 40.

From the loop reactor 40 the polymer-hydrocarbon mixture is fed through one or several exhaust valves 47 described in, e.g., FI Patent Applications Nos. 971368 or 971367. There is a direct product transfer 67 from the loop reactor 40 to gas phase reactor 60.

In the lower part of the gas phase reactor 60 there is a fluid bed consisting of polymer particles, which will be kept in a fluidized state in an ordinary way by circulating the gases removed from the top of the reactor 60 though line 61, compressor 62 and a heat exchanger (not presented) to the lower part of the reactor 60 in an ordinary way. The reactor 60 is advantageously, but not necessarily, equipped with a mixer (described in EP 0 607 703, not shown in the figure). To the lower part of the reactor 60 can be led in a well known way monomers from line 63, optionally comonomer from line 64 and hydrogen from the line 65. The product will be removed from the reactor 60 continually or periodically through the transfer line 66 to the flash tank 68. The overhead product of the recovery system is circulated to the gas phase reactor via a monomer recovery system.

The embodiment shown in FIG. 2 differs from the one in FIG. 1 only in the sense that product from gas phase reactor 160 is fed into the additional gas phase reactor 160b. The polymer particles are removed from the flash tank 168 through the polymer feed tank 150b and the removing line 152b to the gas phase reactor 160b. The gas phase reactor is advantageously equipped with a mixer (not shown).

The overhead of the flash 168b is recycled partly to the gas phase reactor 160b and partly to the monomer recovery system.

Figure 3:
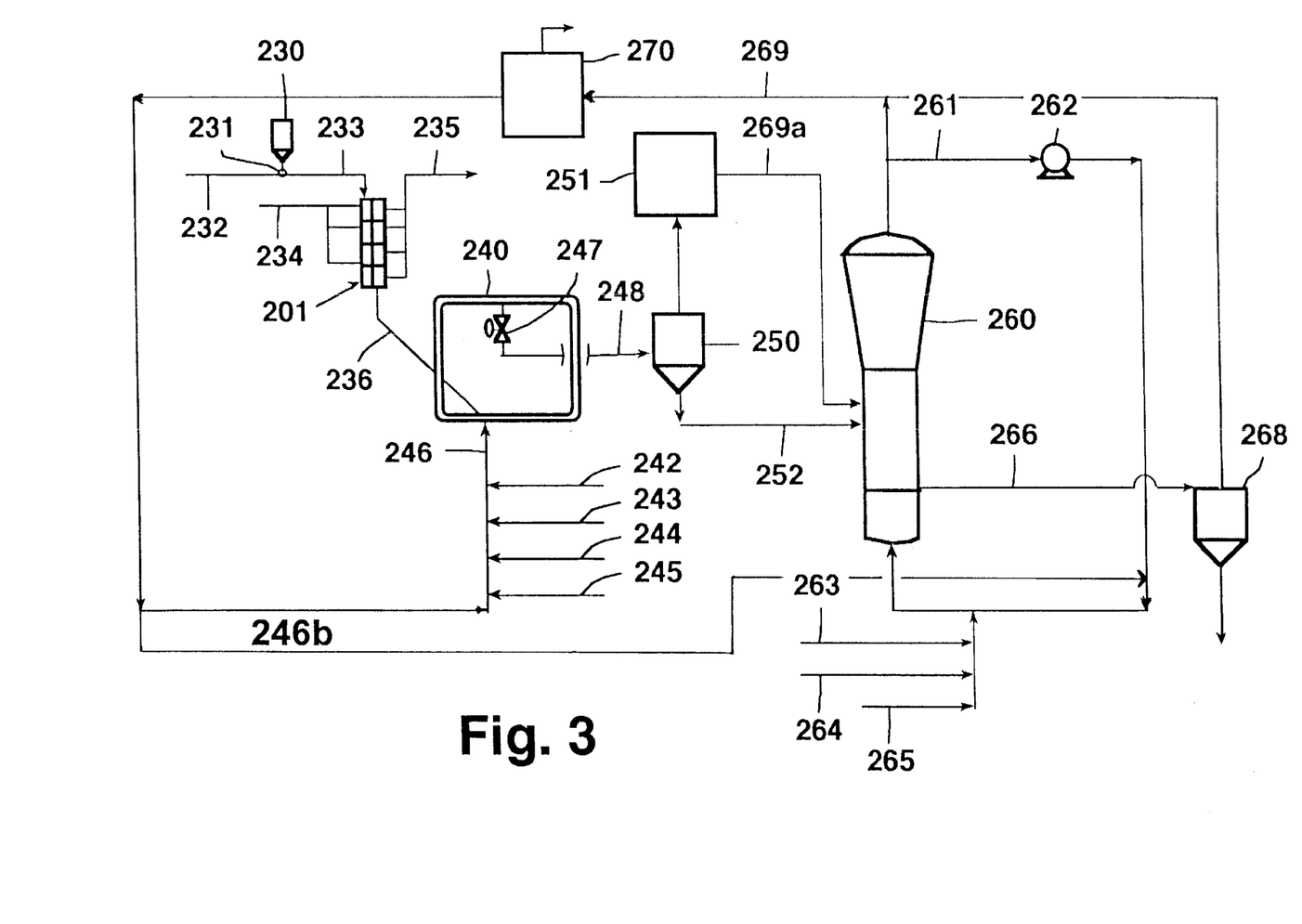
FIG. 3 depicts in a schematic fashion the process configuration of a third preferred embodiment of the invention.

The embodiment shown in FIG. 3 differs from the one in FIG. 1 in that the product of the slurry reactor 240 is conducted to a flash separator 250. The hydrocarbon medium is removed from the polymer particles, the remaining monomer and hydrogen are removed from the flash separator 250 either through to the recovery unit 251 or preferably to gas phase reactor 260 through the line 269a after possible separation of light components e.g. hydrogen.

In all of the above presented embodiments, the numerals 70, 170, and 270 signify separation means, such as membrane unit or stripping columns, which are capable of freeing the recycle monomer of the gas phase reactor(s) (60, 160, 160b and 260) or of the separators (68, 168, 168b and 268) from hydrogen and/or light inert hydrocarbons typically having a lower boiling point than the monomer(s).

The following non-limiting examples will illustrate the principles of the present invention.

EXAMPLE 1

A production scale plant for continuous production of PP-homopolymer was simulated. The plant comprises catalyst, alkyl, donor, propylene feed systems, prepolymerization reactor, loop reactor and a fluidized bed gas phase reactor (GPR).

The catalyst, alkyl, donor and propylene were fed to the prepolymerization reactor. The polymer slurry from the prepolymerization reactor was fed to a loop reactor to which also hydrogen and more propylene was fed. The polymer slurry from the loop reactor and additional hydrogen and propylene was fed to the GPR. The production in the reactors were 300 kg/h in prepolymerization, 15 t/h in loop and 10 t/h in GPR.

The prepolymerization loop reactor was operated at a 56 bar pressure and a 20° C. temperature. The loop reactor was operated at a 55 bar pressure and a 85° C. temperature. The MFR (2.16 kg, 230° C.) of the PP-homopolymer produced in the loop was adjusted to 1 by controlling the hydrogen feed.

The GPR was operated at a pressure of 35 bar and a temperature of 85° C. The MFR (2.16 kg, 230° C.) of the PP-homopolymer taken out of the GPR was adjusted to 13 by controlling the partial pressure of hydrogen. 5 t/h of propene was recirculated from the GPR outlet back to the loop reactor. The once-through conversion of propylene was 83%.

EXAMPLE 2

A production scale plant for continuous production of PP-copolymer with good impact properties was simulated. The plant comprises catalyst, alkyl, donor, propylene feed systems, prepolymerization reactor, loop reactor and a 2 fluidized bed gas phase reactors (cf. FIG. 2).

The catalyst, alkyl, donor and propylene were fed to the prepolymerizaiton reactor. The polymer slurry from the prepolymerization reactor was fed to the loop reactor to which also hydrogen and more propylene was fed. The polymer slurry from the loop reactor and additional hydrogen and propylene was fed to the first GPR.

Before entering the second GPR the polymer from the first GPR was depressurized. Ethylene and additional propylene was fed to the second GPR.

The production in the reactors was 300 kg/h in prepolymerization, 15 t/h in loop and 10 t/h in the first GPR and 6 t/h in the second GPR.

The prepolymerization loop reactor was operated at a pressure of 56 bar and a temperature of 20° C. The loop reactor was operated at a pressure of 55 bar and a temperature of 85° C. The MFR (2.16 kg, 230° C.) of the PP-homopolymer produced in the loop was adjusted to 20 by controlling the hydrogen feed.

The first GPR was operated at a pressure of 35 bar and at a temperature of 85° C. The MFR (2.16 kg, 230° C.) of the PP-homopolymer taken out from the first GPR was set at 20 by adjusting the partial pressure of hydrogen. 4.3 t/h of propene was recirculated from the GPR outlet back to the loop reactor.

The second GPR was operated at a pressure of 20 bar and a temperature of 70° C. The MFR (2.16 kg, 230° C.) of the PP-copolymer taken out from the second GPR was adjusted to 13 by using the partial pressure of hydrogen as a control means. 2.7 t/h of propene was recirculated from the second GPR outlet back to the loop reactor and 1.6 t/h ethylene recirculated to the second GPR.

EXAMPLE 3

A production scale plant for continuous production of random PP polymer was simulated. The plant comprises a catalyst, alkyl, donor, propylene and ethylene feed systems, prepolymerization reactor, loop reactor and a fluidized bed gas phase reactor (GPR).

The catalyst, alkyl, donor and propylene were fed to the prepolymerization reactor. The polymer slurry from the prepolymerization reactor was fed to the loop reactor. Ethylene, hydrogen and more propylene was fed also fed to the loop. The polymer slurry from the loop reactor and additional hydrogen, ethylene and propylene was fed to GPR. The production rate in the reactors were 300 kh/h during prepolymerization, 15 t/h in the loop and 10 t/h in the GPR.

The prepolymerization reactor was operated at a pressure of 56 bar and a temperature of 20° C. The loop reactor was operated at a pressure of 55 bar and a temperature of 75° C. The MFR (2.16 kg, 230° C.) of the random-PP produced in the loop was adjusted to 7 by controlling the hydrogen feed, and the ethylene content was adjusted to 3.5% w/w by the ethylene feed.

The GPR was operated at a pressure of 35 bar and a temperature of 80° C. The MFR (2.16 kg, 230° C.) of the random-PP taken out from the GPR was adjusted to 7 by controlling the partial pressure of hydrogen, and the ethylene content was set at 3.5% by adjusting the partial pressure of ethylene. 5 t/h of propene and 33 kg/h ethylene was recirculated from the GPR outlet back to the loop reactor. The once-through conversion of the propylene and ethylene were 83% and 96% respectively.

EXAMPLE 4

A production scale plant for continuous production of PP-copolymer with good impact and creep properties was simulated. The plant comprises catalyst, alkyl, donor, ethylene and propylene feed systems, a prepolymerization reactor, a loop reactor, a flash tank and 2 fluidized bed gas phase reactors.

The catalyst, alkyl, donor and propylene were fed to the prepolymerization reactor. The polymer slurry from the prepolymerization reactor was fed to a loop reactor to which also hydrogen and more propylene was fed. The polymer slurry from the loop reactor was fed to a flash tank, wherein propylene and polymer were separated.

The polymer from flash tank was fed to the first GPR. Propylene from flash tank was fed to the first GPR after removal of hydrogen. Ethylene and additional propylene was fed to the first GPR. The polymer from first GPR was fed to the second GPR. Ethylene, some hydrogen and additional propylene were fed to the second GPR.

The production in the reactors comprised 300 kg/h in prepolymerization, 10 t/h in loop and 10 t/h in the first GPR and 6 t/h in the second GPR.

The prepolymerization reactor was operated at a pressure of 56 bar and a temperature of 20° C. The loop reactor was operated at a pressure of 55 bar and a temperature of 85° C. The MFR (2.16 kg, 230° C.) of the PP-homopolymer produced in the loop was set at 100 by adjusting the hydrogen feed.

The GPR was operated at a pressure of 35 bar and a temperature of 80° C. The MFR (2.16 kg, 230° C.) of the PP of the GPR was set at 0.4 by controlling the production split between the reactors and the efficiency of hydrogen removal of flashed propene. Ethylene content was set a 2% w/w by the adjusting the partial pressure of ethylene and controlling the production split between the reactors.

The second GPR was operated at a pressure of 20 bar and a temperature of 70° C. The MFR (2.16 kg, 230° C.) of the PP-copolymer in taken out of the second GPR was adjusted to 0.3 by controlling the partial pressure of hydrogen and by controlling the production split between the reactors. Minor amounts of propylene were circulated from the second GPR back to the loop reactor.

EXAMPLE 5

A production scale plant for continuous production of PP-copolymer with good creep properties was simulated. The plant comprises catalyst, alkyl, donor, ethylene and propylene feed systems, a prepolymerization reactor, a loop reactor, a flash tank and a fluidized bed gas phase reactor.

The catalyst, alkyl, donor and propylene were fed to prepolymerization reactor. The polymer slurry from the prepolymerization reactor were fed to a loop reactor to which also ethylene and more propylene was fed. The polymer slurry from the loop reactor was fed to a flash tank, wherein monomers and polymer were separated.

The polymer from flash tank was fed to the GPR. Propylene from the flash tank was fed to the GPR after removal of ethylene. Hydrogen and additional propylene were fed to the GPR.

The production in the reactors were 300 kg/h during prepolymerization, 10 t/h in loop and 10 t/h in the first GPR.

EXAMPLE 6

A pilot plant operated continuously was used to produce PP-homopolymer. The plant comprises catalyst, alkyl, donor, propylene feed systems, a prepolymerization reactor, a loop reactor and a fluidized bed gas phase reactor (GPR).

The catalyst, alkyl, donor and propylene were fed to the prepolymerization reactor. The polymer slurry from the prepolymerization reactor was fed to a loop reactor to which also hydrogen and more propylene was fed. The polymer slurry from the loop reactor and additional hydrogen and propylene was fed to the GPR.

The formed polymer and unreacted propylene were separated after removal of the polymerization product from the GPR.

The catalyst used was a highly active and stereospecific ZN-catalyst made according to U.S. Pat. No. 5,234,879. The catalyst was contacted with triethylaluminium (TEA) and dicyclopentyldimethoxysilane (DCPDMS) (Al/Ti ratio was 250 and A1/Do 40 (mole) before feeding to the prepolymerization reactor.

The catalyst was fed according to U.S. Pat. No. 5,385,992 and was flushed with propylene to the prepolymerization reactor. The prepolymerization reactor was operated at 51 bar pressure, 20° C. temperature and mean residence time of catalyst at 7 min.

The prepolymerized catalyst propylene and other components were transferred to the loop reactor. The loop reactor was operated at a pressure of 50 bar, a temperature of 80° C. and a mean residence time of the catalyst of 1 h. The MFR (2.16 kg, 230° C.) of the PP-homopolymer produced in the loop was adjusted to 7 by using the hydrogen feed as a control means.

The polymer slurry from the loop reactor was transferred to the GPR. The GPR reactor was operated at a total pressure of 29 bar and a partial pressure of propylene amounting to 21 bar. The temperature was 90° C. and the mean residence time of the catalyst was 1 h. The MFR (2.16 kg, 230° C.) of the PP-homopolymer taken out of the GPR was 7 controlled by adjusting the partial pressure of hydrogen. The production split between the reactors was 1% in prepolymerization, 49% in loop and 50% in GPR. Catalyst productivity was 32 kg PP/g cat.

EXAMPLE 7

A continuously operated pilot plant was used to produce PP-homopolymers. The plant comprises catalyst, alkyl, donor propylene feeds systems, a prepolymerization reactor, a loop reactor and a fluidized bed gas phase reactor (GPR).

The catalyst, alkyl, donor and propylene were fed to the prepolymerization reactor. The polymer slurry from the prepolymerization reactor was fed to the loop reactor to which also hydrogen and more propylene was fed. The polymer slurry from the loop reactor and additional hydrogen and propylene was fed to the GPR.

The polymer formed and unreacted propylene where separated after removal from the GPR.

The catalyst used was a highly active and sterospecific ZN-catalyst made according to FI Patent Application No. 963707. The catalyst was contacted with triethylaluminium (TEA) and dicyclopentyldimethoxysilane (DCPDMS) (Al/Ti ratio was 250 and Al/Do 40 (mole) before feeding to the prepolymerization reactor.

The catalyst was fed according to U.S. Pat. No. 5,385,992 and was flushed with propylene to the prepolymerization reactor. The prepolymerization reactor was operated at a pressure of 53 bar, a temperature of 20° C. and a mean residence time of the catalyst of 7 min.

The prepolymerized catalyst propylene and other components were transferred to the loop reactor. The loop reactor was operated at a pressure of 52 bar, a temperature of 85° C. and mean residence time of the catalyst at 1 h. The MFR (2.16 kg, 230° C.) of the PP-homopolymer produced in the loop was adjusted to 7 by controlling the hydrogen feed.

The polymer slurry from the loop reactor was transferred to the GPR. The GPR was operated at a total pressure of 29 bar and a partial propylene pressure of 21 bar. The temperature of the GPR was 80° C. and the mean residence time of the catalyst 1 h. The MFR (2.16 kg, 230° C.) of the PP-homopolymer taken out of the GPR was 7 and it was adjusted by controlling the partial pressure of hydrogen. The production split between the reactors was 1% in prepolymerization, 53% in loop and 48% in GPR. Catalyst productivity was 50 kg PP/g cat.

EXAMPLE 8

A continuously operated pilot plant was used to produce PP-homopolymer. The plant comprises catalyst, alkyl, donor, propylene feed systems, prepolymerization reactor, loop reactor and a fluidized bed gas phase reactor (GPR).

The catalyst, alkyl, donor and propylene were fed to the prepolymerization reactor. The polymer slurry from the prepolymerization reactor was fed to the loop reactor to which also hydrogen and more propylene was fed. The polymer slurry from the loop reactor and additional hydrogen and propylene was fed to the GPR.

The polymer formed and unreacted propylene were separated after product removal from the GPR.

The catalyst used was a highly active and sterospecific ZN-catalyst made according to U.S. Pat. No. 5,234,879. The catalyst was contacted with triethylaluminium (TEA) and dicyclopentyldimethoxysilane (DCPDMS) (Al/Ti ratio was 250 and Al/Do 40 (mole) before feeding to the prepolymerization reactor.

The catalyst was fed according to U.S. Pat. No. 5,385,992 and was flushed with propylene to the prepolymerization reactor. The prepolymerization reactor was operated at a 58 bar pressure, a 20° C. temperature and a mean residence time of the catalyst of 7 min.

The prepolymerized catalyst propylene and other components were transferred to the loop The loop reactor was operated at 57 bar pressure, 80° C. temperature and a mean residence time of the catalyst of 2 h. The MFR (2.16 kg, 230° C.) of the PP-homopolymer produced in the loop was set at 375 via the hydrogen feed.

The polymer slurry from the loop reactor was transferred to the GPR. The GPR was operated at a total pressure of 29 bar and a partial propylene pressure of 16 bar. The temperature of the reactor was 80° C. and the mean residence time of the catalyst 2 h. The MFR (2.16 kg, 230° C.) of the PP-homopolymer taken out of the GPR was 450 and it was adjusted by controlling the partial pressure of hydrogen and by controlling the production split between the reactors. The production split was adjusted to comprise 1% in prepolymerization, 50% in loop and 49% in GPR.

EXAMPLE 9

A continuously operated pilot plant was used to produce PP-randompolymer. The plant comprises catalyst, alkyl, donor, propylene and ethylene feed systems, a loop reactor and a fluidized bed gas phase reactor (GPR).

The catalyst, alkyl, donor and propylene were fed to the prepolymerization reactor. The polymer slurry from the loop reactor and additional hydrogen, propylene and ethylene was fed to the GPR. The polymer formed and unreacted propylene were separated after removal from the GPR.

The catalyst used was a highly active and sterospecific ZN-catalyst made according to U.S. Pat. No. 5,234,879. The catalyst was prepolymerized with propylene (the mass ratio of PP/cat was 10) in batch according to EP 0 607 703. The prepolymerized catalyst was contacted with triethylaluminium (TEA) and dicyclopentyldimethoxysilane (DCPDMS) (Al/Ti ratio was 140 and Ai/Do 10 (mole) before feeding to the loop reactor.

The catalyst was fed according to U.S. Pat. No. 5,385,992 and was flushed with propylene to the loop reactor. The loop reactor was operated at a 50 bar pressure, a 75° C. temperature and a mean residence time of the catalyst of 1 h. The MFR (2.16 kg, 230° C.) of the PP-random-polymer produced in the loop adjusted to 4 via the hydrogen feed. The ethylene content was controlled to be 3.5% w/w via the ethylene feed.

The polymer slurry from the loop reactor was transferred to the GPR. The GPR reactor was operated at a total pressure of 29 bar and a partial propylene pressure of 21 bar. The operational temperature of the GPR was 80° C. and the mean residence time of the catalyst was 1.5 h. The MFR (2.16 kg, 230° C.) of the PP-randompolymer taken out of the GPR was adjusted to 4 via the partial pressure of hydrogen. The ethylene content was controlled to be 3.5% w/w via partial pressure of ethylene. The production split between the reactors was 55% in the loop and 45% in the GPR.

EXAMPLE 10

A continuously operated pilot plant was used to produce PP-random polymer. The plant comprises catalyst, alkyl, donor, propylene and ethylene feed systems, a loop reactor and a fluidized bed gas phase reactor (GPR).

The catalyst, alkyl, donor and propylene were fed to the prepolymerization reactor. The polymer slurry from the loop reactor and additional hydrogen and propylene was fed to the GPR. The polymer formed and unreacted propylene were separated after removal from GPR.

The catalyst used was a highly active and sterospecific ZN-catalyst made according to U.S. Pat. No. 5,234,879. The catalyst was prepolymerized with propylene (the mass ratio of PP/cat was 10) in batch according to EP 0 607 713. The prepolymerized catalyst was contacted with triethylaluminium (TEA) and dicyclopentyldimethoxysilane (DCPDMS) (Al/Ti ratio was 135 and Al/Do 10 (mole) before feeding to the loop reactor.

The catalyst was fed according to U.S. Pat. No. 5,385,992 and was flushed with propylene to the loop reactor. The loop reactor was operated at a pressure of 50 bar, a temperature of 75° C. and a mean residence time of the catalyst of 1 h. The MFR (2.16 kg, 230° C.) of the PP-randompolymer produced in the loop was set at 0.2 by adjusting the hydrogen feed. The ethylene content was 3.5% w/w and adjusted by controlling the ethylene feed.

The polymer slurry from the loop reactor was transferred to the GPR. The GPR reactor was operated at a total pressure of 29 bar and a partial propylen pressure of 21 bar. The operational temperature was 80° C. and the mean residence time of the catalyst was 1.5 h. The MFR (2.16 kg, 230° C.) of the PP-random polymer taken out of the GPR as adjusted to 3 by controlling the partial pressure of the hydrogen. The ethylene content was set at 1.8% w/w by adjusting the production split between the reactors. The desired ethylene content was achieved at a production split of 40% in loop and 60% in GPR.

The prepolymerization reactor was operated at a 56 bar pressure and a 20° C. temperature. The loop reactor was operated at a 55 bar pressure and a 75° C. temperature. The MFR (2.16 kg, 230° C.) of the random-PP produced in the loop was below 0.1 and the ethylene content was adjusted to 3.5% w/w by controlling the ethylene feed.

The GPR reactor was operated at a 35 bar pressure and a 80° C. temperature. The MFR (2.16 kg, 230° C.) of the PP-copolymer taken out of the GPR was 0.3 and adjusted by the partial hydrogen pressure. The ethylene content was set a 1.8% w/w by adjusting the production split between the reactors.

Ethylene in the loop outlet was recovered from the flash gases and circulated back to the loop reactor. Propylene in the outlet of the GPR was recovered and fed to the loop reactor after removal of hydrogen. The once-through conversions of propylene and ethylene were 83% and 84%, respectively.

EXAMPLE 11

A continuously operated pilot plant was used to produce PP-copolymer with good impact and creep properties. The plant comprises catalyst, alkyl, donor, propylene and ethylene feed systems, a prepolymerization reactor, a loop reactor and two fluidized bed gas phase reactors (GPR).

The catalyst, alkyl, donor and propylene are fed to the prepolymerization reactor. The polymer slurry from the prepolymerization reactor is fed to a loop reactor to which also hydrogen, ethylene and additional propylene are fed.

The polymer slurry from the loop reactor and additional hydrogen and propylene are fed to the first GPR. The polymer from the first GPR is fed to the second GPR. Ethylene, some hydrogen and additional propylene was fed to the second GPR. The polymer formed and unreacted propylene are separated after removal from the second GPR.

The catalyst used is a highly active and sterospecific ZN-catalyst made according to U.S. Pat. No. 5,234,879. The catalyst is contacted with triethylaluminium (TEA) and dicyclopentyldimethoxysilane (DCPDMS) (Al/Ti ratio is 150 and Al/Do 10 (mole) before feeding to the prepolymerization reactor.

The catalyst is fed according to U.S. Pat. No. 5,385,992 and is flushed with propylene to the loop reactor. The prepolymerization reactor is operated at a pressure of 51 bar, a temperature of 20° C. and a mean residence time of the catalyst of 7 min.

The loop reactor is operated at a 50 bar pressure, a 75° C. temperature and a mean residence time of the catalyst of 1 h. The MFR (2.16 kg, 230° C.) of the PP-randompolymer produced in the loop is adjusted to 7 by controlling the hydrogen feed. The ethylene content is adjusted to 3.5% w/w by using the ethylene feed as a control means.

The polymer slurry from the loop reactor is transferred to the first GPR. The first GPR reactor is operated at a total pressure of 29 bar and a partial propylen pressure of 21 bar. The operational temperature is 80° C. and the mean residence time of the catalyst 1.5 h. The MFR (2.16 kg, 230° C.) of the PP-randompolymer taken out of the GPR adjusted to 10 by using the partial hydrogen pressure. The ethylene content is set at 2% w/w by adjusting the production split between the reactors.

The polymer from the first GPR is transferred to the second GPR. The second GPR is operated at a total pressure of 10 bar and a partial monomer pressure of 7 bar. The operational temperature is 80° C. and mean residence time of the catalyst 1.5 h. The MFR (2.16 kg, 230° C.) of the PP-copolymer taken out of the GPR is adjusted to 7 via the partial pressure of the hydrogen. The ethylene content is set at 10% w/w by adjusting the partial pressure of ethylene and by controlling the production split between the reactors.

The desired properties are achieved with a production split of 1% in prepolymerization, 40% in loop and 40% in the first GPR and 19% in the second GPR.

EXAMPLE 12

A continuously operated pilot plant was used to produce very soft PP-copolymer. The plant comprises catalyst, alkyl, donor, propylene and ethylene feed systems, prepolymerization reactor, loop reactor and a fluidized bed gas phase reactor (GPR).

The catalyst, alkyl, donor and propylene were fed to the prepolymerization reactor. The polymer slurry from the prepolymerization reactor was fed to a loop reactor ton which also hydrogen, ethylene and additional propylene was fed.

The polymer slurry from the loop reactor and additional ethylene, hydrogen and propylene were fed to the GPR. The formed polymer and unreacted monomers were separated after removal from GPR.

The catalyst used was a highly active and sterospecific ZN-catalyst made according to U.S. Pat. No. 5,234,879. The catalyst was contacted with triethylaluminium (TEA) and dicyclopentyl-dimethoxysilane (DCPDMS) (Al/Ti ratio was 150 and Al/Do 10 (mole) before feeding to the prepolymerization reactor.

The catalyst was fed according to U.S. Pat. No. 5,385,992 and was flushed with propylene to the loop reactor. The prepolymerization reactor was operated at a 51 bar pressure, a 20° C. temperature and a mean residence time of the catalyst of 7 min.

The loop reactor was operated at a pressure of a 50 bar, a temperature of 75° C. temperature and mean residence time of the catalyst at 1 h. The MFR (2.16 kg, 230° C.) of the PP-random-polymer produced in the loop was controlled to be 4 via hydrogen feed. The ethylene content was adjusted to 3.8% w/w by controlling the ethylene feed.

The polymer slurry from the loop reactor was transferred to the first GPR. The first GPR reactor was operated at a total pressure of 29 bar and a partial propylene pressure of 21 bar. The operational temperature was 80° C. and the mean residence time of the catalyst 1.2 h. The MFR (2.16 kg, 230° C.) of the PP-randompolymer taken out of the GPR was set at 2.5 by adjusting the partial hydrogen pressure. The ethylene content was set at 8% w/w by adjusting production split between the reactors and the partial pressure of ethylene.

Desired properties are achieved with a production split of 1% prepolymerization, 45% in loop and 55% in the GPR.

The polymer from the GPR could have been transferred to another GPR to produce even softer PP copolymer by having even higher partial pressure of ethylene in the second GPR.

EXAMPLE 13

A continuously operated pilot plant was used to produce PP-copolymer with good creep properties. The plant comprises catalyst, alkyl, donor, propylene and ethylene feed systems, a prepolymerization reactor, a loop reactor and a fluidized bed gas phase reactor (GPR).

The catalyst, alkyl, donor and propylene were fed to the prepolymerization reactor. The polymer slurry from the prepolymerization reactor was fed to the loop reactor to which also hydrogen, additional propylene was fed.

The polymer slurry from the loop reactor was fed to a flash tank wherein monomers and polymer were separated. The polymer from the flash tank was fed to the GPR. Propylene from flash tank was fed to the GPR after removal of hydrogen. Ehylene, additional hydrogen and additional propylene were fed to the GPR.

The catalyst used was a highly active and sterospecific ZN-catalyst made according to U.S. Pat. No. 5,234,879. The catalyst was contacted with triethylaluminium (TEA) and dicyclopentyldimethoxysilane (DCPDMS) (Al/Ti ratio was 140 and Al/Do 10 (mole) before feeding to the prepolymerization reactor.

The catalyst was fed according to U.S. Pat. No. 5,385,992 and was flushed with propylene to the loop reactor. The prepolymerization reactor was operated at a 51 bar pressure, a 20° C. temperature and a mean residence time of the catalyst of 7 min.

The loop reactor was operated at a 50 bar pressure, a 75° C. temperature and a mean residence time of the catalyst of 1 h. The MFR (2.16 kg, 230° C.) of the PP-randompolymer produced in the loop was set at 10 by adjusting the hydrogen feed.

The GPR reactor was operated at a total pressure of 29 bar and a partial propylene pressure of 16 bar. The operational temperature was 80° C. and the mean residence time of the catalyst 1.1 h. The MFR (2.16 kg, 230° C.) of the PP-copolymer taken out of the GPR was adjusted to 5 via the partial hydrogen pressure and via the production split between the reactors. The ethylene content was adjusted to 3.5% w/w by controlling the production split between the reactors and partial pressure of ethylene.

Desired properties are achieved with production split of 1% in prepolymerization, 40% in loop and 59% in the GPR.

The polymer from the GPR could have been transferred to another GPR to produce PP copolymer with better impact properties by having even higher partial pressure of ethylene in the second GPR.

What is claim is:

1. A process for preparing propylene homopolymers and copolymers, which comprises polymerizing propylene optionally with comonomers in the presence of a catalyst at elevated temperature and pressure in at least one slurry reactor and at least one slurry reactor and at least one gas phase reactor, the polymerization product of at least on slurry reactor, containing unreacted monomers, being directly conducted to a first gas phase reactor without recycling of the unreacted monomers to the slurry reactor, whereby the production split of the slurry reactor is 20 to 70 wt-% of the total production of the slurry reactor and the first gas phase reactor.

2. The process according to claim 1, wherein the polymerization product of the slurry reactor comprises polymeric substances selected from the group consisting of polypropylene, propylene copolymers and mixtures of polypropylene and propylene copolymers.

3. The process according to claim 1 or 2, wherein the slurry reactor comprises a loop reactor and wherein the concentration of propylene in the reaction medium is maintained in excess of 60 wt-% to form a particulate product.

4. The process according to claim 1, wherein the slurry reactor is operated at a temperature in the range of 60 to 80° C. for preparing random or ter-copolymers.

5. The process according to claim 1, wherein the slurry reactor is operated at a temperature in the range of 80° C. to the critical temperature of the reaction medium.

6. The process according to claim 1, wherein the slurry reactor is operated at a temperature higher than the critical temperature of the reaction medium and below the softening temperature of the polymer.

7. The process according to claim 1, wherein the slurry reactor is operated at a pressure in the range of 35 to 100 bar.

8. The process according to claim 1, wherein the polymerization product is conducted from the slurry reactor to the first gas phase reactor via a direct pipeline.

9. The process according to claim 1, wherein the reaction medium of the polymerization product is evaporated before the polymerization product is fed into a first gas phase reactor.

10. The process according to claim 9, wherein the polymerization product is conducted from the slurry reactor to the first gas phase reactor via a jacketed pipe line heated by steam for providing at least a part of the energy needed for evaporation of the reaction medium.

11. The process according to claim 1, wherein the polymerization product fed to the first gas phase reactor contains copolymers comprising >0.5 wt-% of at least one comonomer.

12. The process according to claim 11, wherein the polymerization product is copolymerized in the first gas phase reactor with additional comonomers to increase the comonomer content.

13. The process according to claim 12, wherein copolymerization is continued in the gas phase reactor until the comonomer content of the copolymer is at least 20 wt-%.

14. The process according to claim 1, wherein polymerization in the first gas phase reactor is carried out without additional monomer feed.

15. The process according to claim 1, wherein the polymerization product of the gas phase reactor is recovered and modified to provide a product having improved stiffness, creep properties, or softness.

16. The process according to claim 15, wherein the polymerization product is subjected to copolymerization in the presence of comonomers to provide a third polymer product with improved impact strength properties.

17. The process according to claim 16, wherein the copolymerization is carried out in a second gas phase reactor arranged in series with the first gas phase reactor.

18. The process according to claim 16 or 17, wherein the third polymer product is recovered and subjected to further copolymerization to provide a fourth polymer product having properties of improved stiffness, impact balance or stress whitening or white blush properties.

19. The process according to claim 18, wherein the further copolymerization reaction is carried out in a third gas phase reactor arranged in series with the second gas phase reactor.

20. The process according to claim 18, wherein the fourth polymer product is subjected to at least one further co-polymerization reaction in at least one further reactor.

21. The process according to claim 19, wherein at least part of the unreacted monomers are recovered from said second or third gas phase reactor and recycled back to the previous gas phase reactor(s).

22. The process according to claim 1, wherein the unreacted monomers recovered from the first gas phase reactor are recycled back to the gas phase reactor.

23. The process according to claim 1, wherein the unreacted monomers recovered from the first gas phase reactor are recycled back to the slurry reactor.

24. The process according to claim 1, wherein a part of the unreacted monomers recovered from the first gas phase reactor is recycled back to the slurry reactor.

25. The process according to claim 24, wherein the amount of monomers recycled comprises 1 to 65 wt-% of the amount of monomers in the feed of the slurry reactor.

26. The process according to claim 1, wherein the production rate of the slurry reactor is 20 to 65 wt-% of the total production rate of the slurry and the first gas phase reactor.

27. The process according to claim 1, wherein hydrogen is used in at least one reactor as a molar mass modifier.

28. The process according to claim 1, wherein the catalyst used is prepolymerized before feeding it into the process.

29. The process according to claim 11, wherein the polymerization product fed to the first gas phase reactor contains copolymers comprising 2 to 16 wt-% of at least one comonomer.

30. A process for preparing propylene homopolymers and copolymers, which comprises polymerizing propylene optionally with comonomers in the presence of a catalyst at elevated temperature and pressure in at least one slurry reactor and at least one gas phase reactor, the polymerization product of at least one slurry reactor, containing unreacted monomers, being directly conducted to a first gas phase reactor without recycling of the unreacted monomers to the slurry reactor, wherein the production rate of the slurry reactor is 40 to 60 wt-% of the total production rate of the slurry and the first gas phase reactor.

* * * * *

UNITED STATES PATENT AND TRADEMARK OFFICE
CERTIFICATE OF CORRECTION

PATENT NO.     : 6,455,643 B1
DATED          : September 24, 2002
INVENTOR(S)    : Ali Harlin It is certified that error appears in the above-identified patent and that said Letters Patent is hereby corrected as shown below:

Column 27,
Line 2, please delete "and at least one slurry reactor".

Signed and Sealed this

Fourteenth Day of October, 2003

JAMES E. ROGAN
*Director of the United States Patent and Trademark Office*